Figure 1:
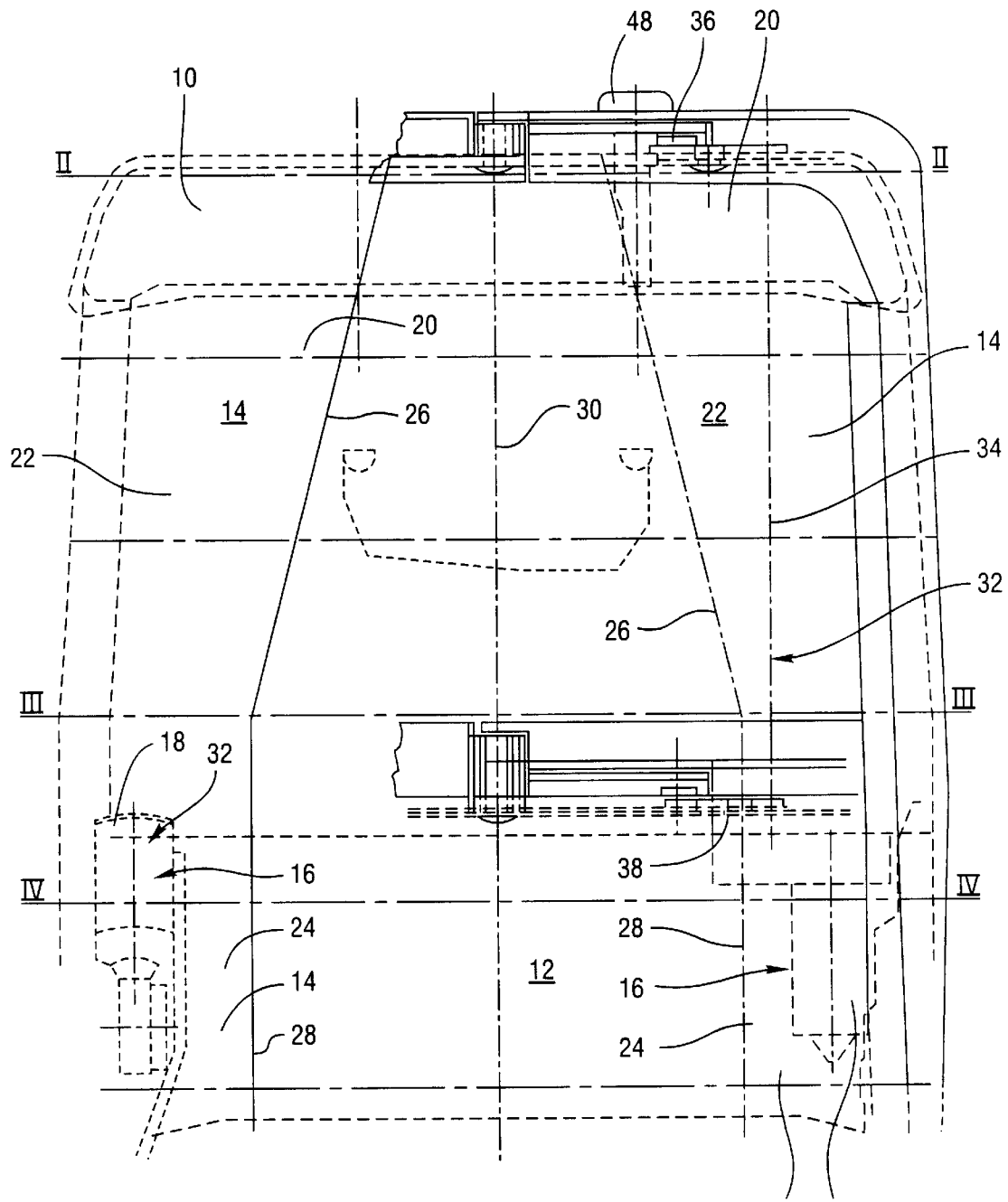

United States Patent [19]
Walk et al.

[11] Patent Number: 5,975,633
[45] Date of Patent: Nov. 2, 1999

[54] MOTOR VEHICLE SEAT

[75] Inventors: Hansjörg Walk, Reutlingen; Peter Groche, Kaiserslautern, both of Germany

[73] Assignee: Lear Corporation, Southfield, Mich.

[21] Appl. No.: 09/011,967

[22] PCT Filed: Jun. 13, 1997

[86] PCT No.: PCT/EP97/03092

§ 371 Date: Apr. 6, 1998

§ 102(e) Date: Apr. 6, 1998

[87] PCT Pub. No.: WO97/48571

PCT Pub. Date: Dec. 24, 1997

[30] Foreign Application Priority Data

Jun. 20, 1996 [DE] Germany ............... 196 24 587

[51] Int. Cl.⁶ .................................. A47C 3/025
[52] U.S. Cl. .................... 297/284.9; 297/284.1
[58] Field of Search ............... 297/284.1, 452.4, 297/284.3, 284.9

[56] References Cited

U.S. PATENT DOCUMENTS

| | | |
|---|---|---|
| 4,636,000 | 1/1987 | Nishino . |
| 4,655,505 | 4/1987 | Kashiwamura et al. . |
| 4,722,550 | 2/1988 | Imaoka et al. . |
| 4,924,162 | 5/1990 | Sakamoto et al. . |
| 4,924,163 | 5/1990 | Sakamoto et al. . |
| 5,129,704 | 7/1992 | Kishi et al. . |
| 5,130,622 | 7/1992 | Takizawa et al. . |
| 5,263,765 | 11/1993 | Nagashima et al. . |
| 5,320,409 | 6/1994 | Katoh et al. . |
| 5,328,236 | 7/1994 | Mizushima et al. . |
| 5,707,109 | 1/1998 | Massara et al. . |

FOREIGN PATENT DOCUMENTS

| | | |
|---|---|---|
| 142822 | 5/1985 | European Pat. Off. . |
| 2721539 | 11/1978 | Germany . |
| 3505088 | 11/1986 | Germany . |
| 2253343 | 9/1992 | United Kingdom . |

*Primary Examiner*—Milton Nelson, Jr.
*Attorney, Agent, or Firm*—Brooks & Kushman PC

[57] ABSTRACT

A motor vehicle seat with mutually movable side supports of seat components adjustable by an adjusting device. As the state of movement of the vehicle can be detected by a detecting device, allowing the adjuster to control at least one side support via an actuator in such a way that, during lateral acceleration during travel the seat user is automatically relieved of stress, a motor vehicle seat is provided which effects a dynamic seat adjustement for the user dependently upon the prevailing state of movement and thus makes him/her more comfortable.

23 Claims, 4 Drawing Sheets

MOTOR VEHICLE SEAT

The invention relates to a motor vehicle seat with side supports of seat components which are arranged so as to be movable relative to one another and which are adjustable by means of an adjusting device. These components form adjustable seat contours.

Known seats have a number of static adjusting capabilities in order to adapt the seat position and the seat contour to the individual dimensions of the occupant's body. Adjustable shoulder supports in the shoulder region are known which permit the shoulder region to be turned around the transverse axis of the vehicle.

If the vehicle is driven through a curve, the occupant is urged out of the seat away from the curve midpoint. Known solutions to this problem provide, as auxiliary support, side supports in the lower region of the seatrest but these cannot effectively support the relatively large masses of the occupant's upper body and head. In addition to this, with these known embodiments, high local pressure occurs on the side support because the contour of the occupant's back and the contour of the seatrest when loaded transversely to the direction of movement are very different from one another. An additional problem for the driver is that, when driving round a curve, he loses the contact with the shoulder region of the seat on the side away from the curve midpoint because of the steering motion, whilst on the other side of the seat-rest movement is restricted because the shoulder region hampers backwards movement of the shoulder and elbow region.

Proceeding from this state of the art, the object underlying the invention is to provide a motor vehicle seat which, in dependence on the respective state of motion and acceleration permits dynamic adaptation of the seat for the seat user and therefore alleviates the load on him. An object along these lines is achieved by a motor vehicle seat comprising the features of claim 1.

Because of the fact that, according to the characterising part of claim 1, the state of motion of the vehicle may be detected by means of a detection device which causes the adjusting device to control at least one side support, via at least one actuator, in such a way that, when there is transverse acceleration during the driving process, the load on the seat user is alleviated, a motor vehicle seat is provided which, in dependence on the state of side acceleration, permits dynamic adaptation of the respective side support, especially of a shoulder support surface for the seat user and alleviates the load on him.

Thus it is possible for the contact area of the occupant's shoulders to follow the occupant's body and steering motion when driving round curves, an additional support being possible in the lower region of the seat-rest during side acceleration. In addition, it is possible to create additional movement space for the driver when driving round curves by turning away the shoulder rest on the side of the seat facing the curve midpoint.

Further advantageous embodiments of the motor vehicle seat according to the invention are the subject matter of the subclaims.

The dynamic adjusting device described in greater detail below is suitable not only for the backrest of a motor vehicle seat but, rather, can also be used additionally or alternatively for the seat portion or the headrest.

An embodiment of the motor vehicle seat with adjusting device is described in greater detail below with reference to a backrest according to the drawing.

Figure 2:
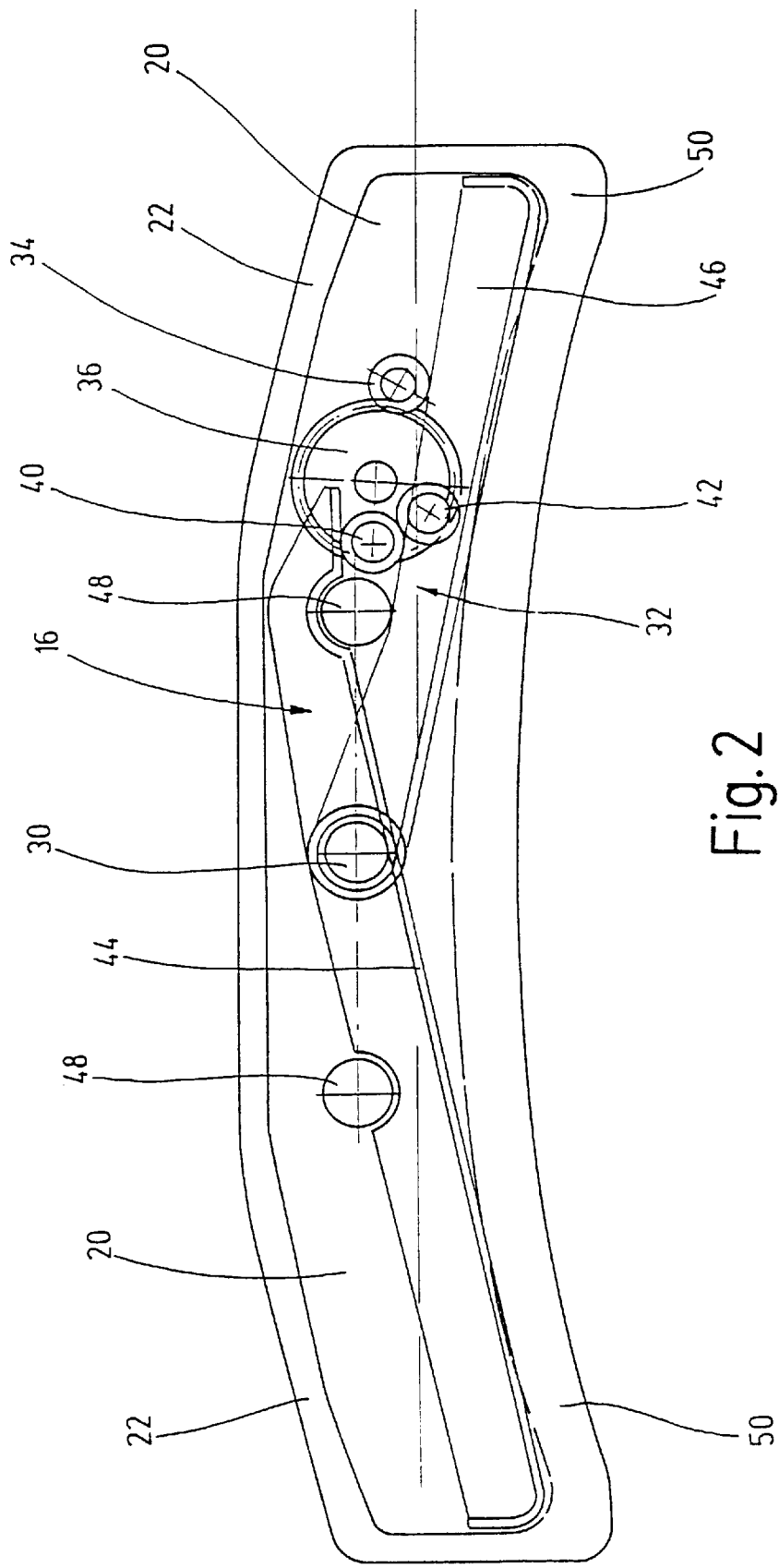
Figure 3:
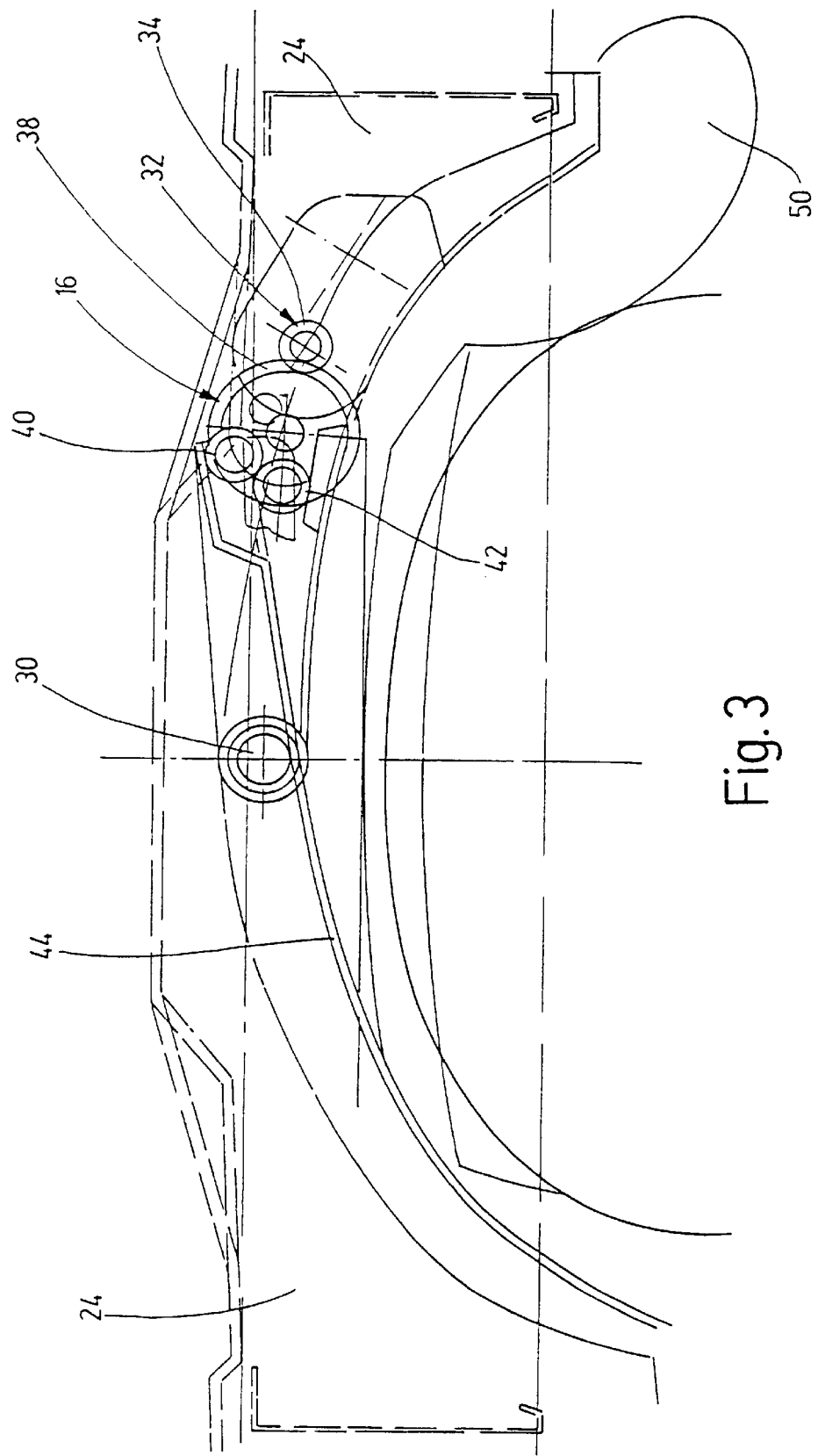
Figure 4:
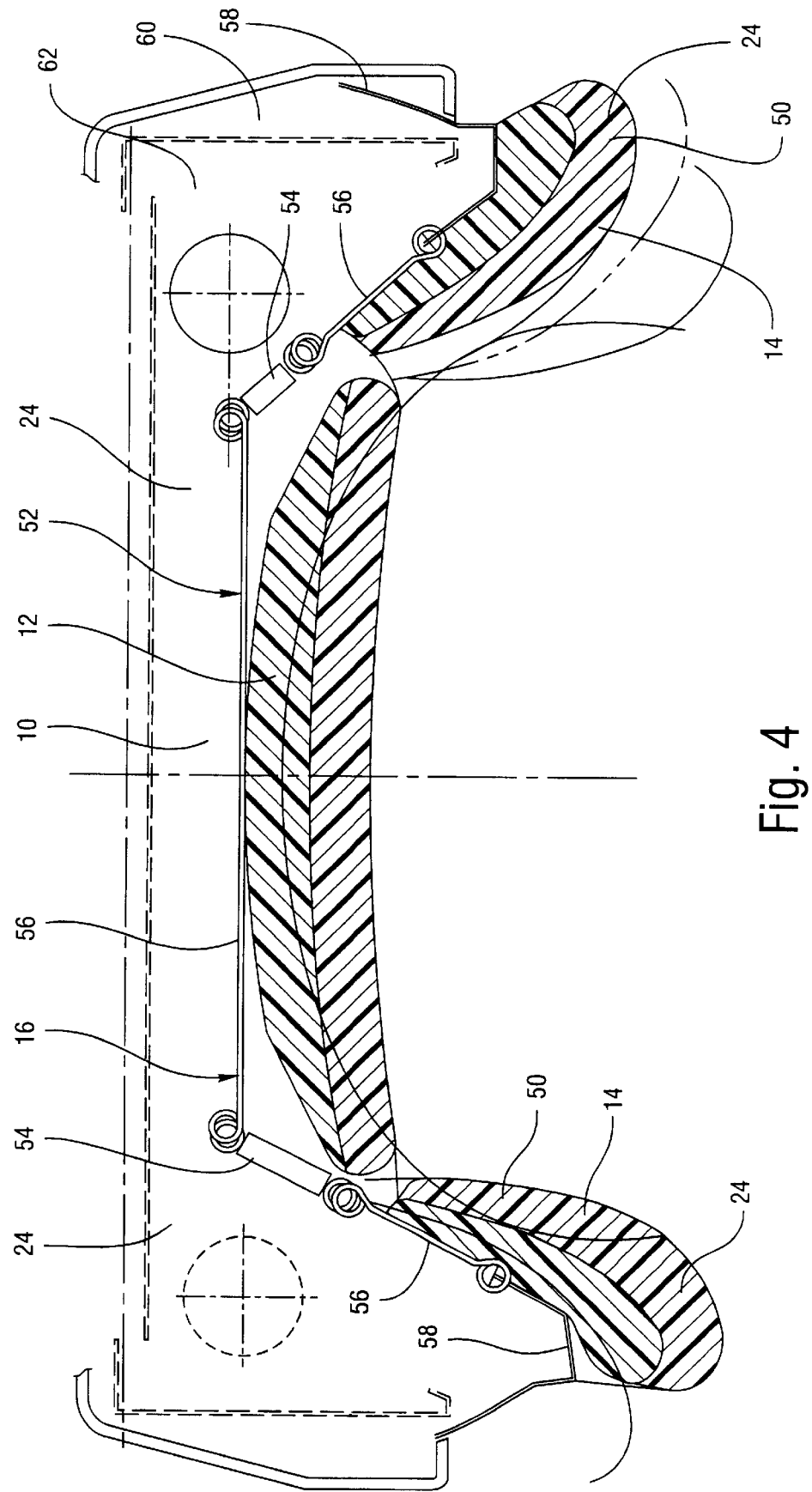

The figures show, in schematic view and not to scale:

FIG. 1 a front view of a backrest,

FIG. 2 a section along line II—II in FIG. 1, enlarged;

FIG. 3 a section along line III—III in FIG. 1, enlarged;

FIG. 4 a section along line IV—IV in FIG. 1, enlarged.

In FIG. 1 a backrest 10 of a motor vehicle seat, not shown in greater detail, is shown in a basic schematic view, seen from the front. The backrest can have centrally a rigid or movable backrest region 12 as well as a side support 14 on each side at the edge. To adjust the side support 14, there is provided in each case, in the region of the backrest 12 and at the edge, an adjusting device indicated in its entirety as 16.

In addition, there is provided a detection device, not shown in detail, which has acceleration sensors and/or movement sensors, especially to detect the acceleration forces on the vehicle or the turning angle of the steering wheel, respectively, and which transmits its measurement data to an electronic evaluation and control unit which causes the adjusting device 16 to control, via individual actuators such as a servomotor 18, at least one side support 14 in such a way that whilst the vehicle is being driven there is automatic alleviation of the load on the seat user.

Thus continuous adaptation of the side support 14, respectively provided for this purpose, in dependence on the vehicle acceleration occurring and/or the amount of the turning angle of the steering wheel, is possible, the relevant side support returning to an initial position by means of the adjusting device 16 or a spring storage device, for example in the case where the state of motion of the vehicle is zero, i.e. the vehicle is stationary. The adjusting device 16, shown in detail below, is suitable not only for use in backrests but can also be used correspondingly for the seat portion or for headrests as an integrated component of the backrest or for headrests as independent motor vehicle seat components. By preference, provision is made for the adjusting device 16, during transverse acceleration in the respective curve direction, to control the side support 14 of the backrest 10 lying on the outside in the direction of the curve.

It has proved particularly advantageous to divide both the side supports 14 of the backrest 10 into two, the upper portion 20 of the respective side support 14 having a shoulder support 22 adapted to the shoulder contour of the seat user, and the lower portion 24 of the respective side support 14 synchronously following the movement of the upper portion 20. The shoulder support 22, as FIG. 1 indicates, can be arranged so as to be rotatable around a swivel axis 26 inclined towards the upper end of the backrest 10, the two swivel axes 26 meeting one another at an acute angle in a hypothetical extension above the backrest 10. The surfaces of the shoulder support 22 facing the seat user are chosen to be of an appropriate area for acting effectively on the shoulder contour. At their lower region, the swivel axes 26 become rotational axes 28 which run vertically, viewed looking towards FIG. 1. The lower portion 24 of the respective side support 14 is arranged so as to be rotatable around the respective rotational axis 28.

However, by preference, provision is made, as with the present embodiment according to FIGS. 1 to 4, for all the portions 20, 24 of the two side supports 14 to be arranged so that they may be swivelled around a common central swivel axis 30, it being possible to provide, at least partially also on a further development along these lines, the possibility of an adjustment movement in respect of the seat user via the swivel or rotational axes 26, 28. In addition, in a relevant development of the invention, these swivel or rotational axes (26, 28) can become boundary lines which limit the swivel movement.

Provision can be made for the respective shoulder support 22 to be configured as one piece, preferably in the form of a triangle or trapezium. The ratio of the largest to the smallest effective width of the side support 14 or the shoulder rest 22 then assumes a value of at least 1 to 1.5, this width ratio being measured transversely to the longitudinal axis of the vehicle.

A servomotor 18 shown in FIG. 1 serves as drive unit for each side support 14 and, via a drive mechanism, indicated in its entirety as 32, synchronously controls the lower portion 24 and the upper portion 20 of each side support 14. The drive mechanism 32 has in each case a drive shaft 34, of which only the central longitudinal axis is shown in schematic view in FIG. 1 and which, for the purposes of simpler representation, is drawn in only on the righthand side in FIGS. 1 et seq., looking towards the respective view. The corresponding ratios could, however, also be provided for the opposite backrest region 12.

The respective drive shaft 34 is driven by a corresponding gear system, for example in the form of toothed wheel gearing, by the associated electric servomotor 18. Both clockwise and anticlockwise drive directions are possible and provided here. As FIGS. 2 and 3 show, the drive shaft 34 meshes with control toothed wheels 36, 36 which are respectively provided with two control cams 40, 42. With an arrangement of the drive mechanism 32 as shown in FIGS. 2 and 3, it is also possible to control respectively both side supports 14 with just one drive unit in the form of the servomotor 18, as is explained below.

Thus the upper control cam 40, seen looking towards FIGS. 2 and 3, is provided to cooperate with a first control bar 44, whilst the second control bar 46 is associated with the lower control cam 42. The two control bars 44, 46 are both passed through by the central swivel axis 30, the first control bar 44 having recesses on sides facing one another, with which recesses the receiving means 48 for receiving a headrest, not shown in detail, engage.

If the control toothed wheels 36, 38 are moved clockwise via the drive shaft 34, the control cam 40 pushes the first control bar 44 from its position as shown in FIG. 2 into a tilted forward position according to the representation in FIG. 3. Hence, a seat user will receive support on the right side of his body when he is driving his vehicle round a left-hand curve. In the opposite direction of rotation of the drive mechanism 32, on the other hand, the second control bar 46 is correspondingly controlled and pushed forward via the lower control cam 42.

In another form of embodiment, not shown in detail, provision can be made for advancing the one control bar 44 and thus the upper portion 20 of the side support 14 in the form of the shoulder rest 22 and for folding back the opposite region with its shoulder rest 22 towards the above-mentioned folding direction. This presents the advantage that, when the one shoulder surface is tilted back during cornering, it is just as much supported backwards as the advancing part of the shoulder is supported in its movement forwards.

Re-setting the respective side support 14 can be effected via the body force of the seat user on unforced contact with the seat upholstery portions 50 or, as is shown in FIG. 4, via a spring system 52 with tension springs 54 which are connected to one another via coupling rods 56 and also connected at the rear with the seat upholstery portions 50 to be adjusted, in particular with the lower portion 24 of the respective side cheek 14. The lower portions 24 of the side support 14 can here be arranged with their seat upholstery portions 50 towards the interior of the seat-rest 10 on shells 58 of the motor vehicle seat, which, when the respective tension springs 54 have been drawn together, are moved back from their extended position on the lefthand side looking towards FIG. 4 into their basic position, wherein then a free edge region of the shell 58 engages in a receiving space 60 of the housing-like skeletal structure of the seat 62.

With the motor vehicle seat according to the invention it is possible to employ the side supports effectively to hold the upper body in the driving position, especially during transverse acceleration. Care is here taken to ensure that the forces acting on the body are absorbed as near as possible to the impact point of the force. Otherwise, where the support is displaced, as is the case with known solutions of this problem, greater muscle and limb stress occurs in more distant regions of the body, such stress being avoided with the present solution.

We claim:

1. A vehicle seat for a motor vehicle, comprising side supports movable relative to one another and adjustable by an adjusting device, wherein a state of motion of the motor vehicle is detectable by a detection device which causes the adjusting device to control, via at least one actuator, a selected side support such that a load on a seat user is alleviated when transverse acceleration occurs during driving, wherein said actuator comprises a servo-motor.

2. The vehicle seat according to claim 1 wherein control of the selected side support is a function of acceleration of the motor vehicle.

3. The vehicle seat according to claim 1 wherein control of the selected side support is a function of a turning angle of a steering wheel.

4. The vehicle seat according to claim 1 wherein control of the selected side support is a function of the speed of the motor vehicle.

5. The vehicle seat according to claim 1 wherein the adjusting device returns the selected side support to an initial position.

6. The vehicle seat according to claim 1 wherein a spring storage device returns the selected side support to an initial position.

7. The vehicle seat according to claim 1 wherein the selected side support is a portion of a seat.

8. The vehicle seat according to claim 1 wherein the selected side support is a portion of a headrest.

9. The vehicle seat according to claim 1 wherein the detection device includes an acceleration sensor.

10. The vehicle seat according to claim 1 wherein the detection device includes a sensor to detect a turning angle of a steering wheel.

11. The vehicle seat according to claim 1 wherein the actuator comprises a servo-working cylinder.

12. The vehicle seat according to claim 1 wherein the actuator comprises a mechanical adjusting member.

13. The vehicle seat according to claim 1 wherein the actuator comprises coupled gears.

14. The vehicle seat according to claim 1 wherein the actuator comprises cam and eccentric drives.

15. The vehicle seat according to claim 1 wherein the actuator comprises a spring system with adjustable spring stiffness.

16. The vehicle seat according to claim 1 wherein when a transverse movement in a curve direction occurs, the adjusting device controls a selected side support.

17. The vehicle seat according to claim 1 wherein the parameters of the movement of the selected side support may be adjusted individually by the seat user.

18. The vehicle seat according to claim 1 wherein the adjusting device may be manually operated.

19. The vehicle seat according to claim 1 wherein the selected side support is a portion of a backrest.

20. The vehicle seat according to claim 19 wherein the backrest includes two side supports and an upper portion of the side support has a shoulder contour adapted to the shoulder contour of the seat user and a lower portion of the side support follows synchronously the movement of the upper portion, and in that the ratio of the largest to the smallest effective width of the side support assumes a value of at least 1 to 1.5.

21. The vehicle seat according to claim 20 wherein associated with each side support of the backrest there is provided a drive unit which controls the lower portion and the upper portion of each side support via a drive mechanism.

22. A vehicle seat for a motor vehicle, comprising side supports movable relative to one another and adjustable by an adjusting device, wherein a state of motion of the motor vehicle is detectable by a detection device which causes the adjusting device to control, via at least one actuator, a selected side support such that a load on a seat user is alleviated when transverse acceleration occurs during driving;

wherein the actuator comprises a servo-working cylinder.

23. A vehicle seat for a motor vehicle, comprising side supports movable relative to one another and adjustable by an adjusting device, wherein a state of motion of the motor vehicle is detectable by a detection device which causes the adjusting device to control, via at least one actuator, a selected side support such that a load on a seat user is alleviated when transverse acceleration occurs during driving;

wherein the actuator comprises cam and eccentric drives.

* * * * *